United States Patent [19]

Schoennahl et al.

[11] Patent Number: 5,286,685

[45] Date of Patent: Feb. 15, 1994

[54] REFRACTORY MATERIALS CONSISTING OF GRAINS BONDED BY A BINDING PHASE BASED ON ALUMINUM NITRIDE CONTAINING BORON NITRIDE AND/OR GRAPHITE PARTICLES AND PROCESS FOR THEIR PRODUCTION

[75] Inventors: Jacques P. R. Schoennahl, Villeurbanne; Michel Dussaulx, Lagnieu, both of France

[73] Assignee: Savoie Refractaires, Venissieux, France

[21] Appl. No.: 987,070

[22] Filed: Dec. 7, 1992

Related U.S. Application Data

[63] Continuation of Ser. No. 774,525, Oct. 8, 1991, abandoned.

[30] Foreign Application Priority Data

Oct. 24, 1990 [FR] France ................. 90 13169

[51] Int. Cl.$^5$ ............ C04B 35/52; C04B 35/54; C04B 35/58
[52] U.S. Cl. .................................. 501/98; 501/87; 501/96; 501/99; 501/100; 501/101; 501/118; 501/127; 501/153; 423/400; 423/439; 423/445; 264/65
[58] Field of Search ............ 501/87, 94, 96, 98, 501/99, 100, 101, 108, 118, 127, 153; 423/400, 439, 445; 264/65

[56] References Cited

U.S. PATENT DOCUMENTS

| | | | |
|---|---|---|---|
| 3,775,139 | 11/1973 | Gamble et al. | 106/57 |
| 4,243,621 | 1/1981 | Mori et al. | 264/65 |
| 4,306,030 | 12/1981 | Watanabe et al. | 501/99 |
| 4,471,059 | 9/1984 | Yoshino et al. | 501/96 |
| 4,585,485 | 4/1986 | Shikano et al. | 106/38.9 |
| 4,605,635 | 8/1986 | Zenbutsu et al. | 501/96 |
| 4,639,474 | 1/1987 | Vezza | 523/141 |
| 4,670,407 | 6/1987 | Kiehl et al. | 501/87 |
| 4,870,037 | 9/1989 | Hoggard et al. | 501/97 |
| 4,871,698 | 10/1989 | Fishler et al. | 501/97 |

FOREIGN PATENT DOCUMENTS

| | | |
|---|---|---|
| 842477 | 6/1976 | Belgium . |
| 0133585 | 2/1985 | European Pat. Off. . |
| 0168295 | 1/1986 | European Pat. Off. . |
| 0198925 | 10/1986 | European Pat. Off. . |
| 0332541 | 9/1989 | European Pat. Off. . |
| 3443250 | 6/1985 | Fed. Rep. of Germany . |
| 3812266 | 8/1989 | Fed. Rep. of Germany . |
| 57-027971 | 2/1982 | Japan . |
| 0321511 | 11/1971 | U.S.S.R. ............ 501/98 |

Primary Examiner—Mark L. Bell
Assistant Examiner—Michael Marcheschi
Attorney, Agent, or Firm—Stevens, Davis, Miller & Mosher

[57] ABSTRACT

The invention relates to refractory materials which comprise:

(A) grains of at least one refractory material whose melting point and thermal decomposition temperature are higher than 1700° C.;

(B) a binding matrix which binds these grains together and predominantly consists of aluminum nitride AlN of hexagonal structure and/or of at least one of the polytypes of AlN; and (C) hexagonal boron nitride particles and/or crystalline graphite flakes dispersed in the binding matrix.

Applications in iron and steel metallurgy, in particular as plates in a slide closure device.

9 Claims, No Drawings

REFRACTORY MATERIALS CONSISTING OF GRAINS BONDED BY A BINDING PHASE BASED ON ALUMINUM NITRIDE CONTAINING BORON NITRIDE AND/OR GRAPHITE PARTICLES AND PROCESS FOR THEIR PRODUCTION

This application is a continuation of application Ser. No. 07/774,525 filed Oct. 8, 1991 now abandoned.

The invention relates to novel refractory materials consisting of grains bonded by a binding phase based on aluminum nitride containing boron nitride and/or graphite particles dispersed therein and to a process for their production.

Iron and steel metallurgy requires increasingly high-performance and reliable refractory materials: the point at issue is, in fact, simultaneously to improve the corrosion resistance, the mechanical strength at high temperatures and the resistance to thermal shocks.

The applications mainly concerned are:

refractory ceramic parts used in devices for the protection or control of jets of cast iron or steel. Particular examples of such parts are slide closure plates, jet protection tubes and immersed nozzles, refractory ceramic parts used in mixing devices, which may either be mechanical or which may operate by blowing in gas, into the molten metal, and seating bricks serving to seat or support devices for blowing in gas and devices for regulating metal jets, and also ladle or distributor impact plates.

The wide variety of stresses to which these materials are exposed often results from the discontinuous operation of the equipment: there is a thermal shock at the start and then at the end of a cycle; during a cycle the refractory parts are successively in contact with the metal and then a molten slag. Finally, between two cycles, the refractory parts, which remain at a relatively high temperature, are subjected to the oxidizing action of the ambient air.

Purely mechanical stresses are always present: mechanical impacts and stresses resulting from handling, confinement stresses created by an external metal shell and finally, int he case of jet control systems, stresses associated with the actual function of the refractory parts, that is to say movements and closing effects.

Finally, it will also be noted that in all cases the refractory parts under consideration are subjected to the erosive action of the molten metal.

The list of properties desired for these refractory materials is thus established as follows:

high mechanical strength at elevated temperature in order to cope either with mechanical stresses or with the effects of erosion resulting from the flow of steel;

excellent resistance to chemical corrosion by cast iron and steel;

good resistance to corrosion by iron and steel slags and covering powders;

non-wettability properties in respect of metals and slags so as to restrict their infiltration into the joins, cracks or pores, but also to reduce the risks of clinging of crusts solidified during cooling operations;

good resistance to oxidation by air;

excellent resistance to thermal shocks;

a non-oxidizing character in the presence of aluminum and calcium dissolved in some steels; and tribological properties in respect of the mobile parts.

Despite a complex and corrosive environment, high reliability is demanded of the refractory parts concerned because any accidental destruction could have catastrophic consequences for the installations and for personnel.

The aim of the present invention is to provide novel refractory materials capable of meeting the abovementioned demands and also a process for their preparation.

More particularly, the invention relates to novel refractory materials which comprise:

(A) grains of at least on refractory material whose melting point and thermal decomposition temperature are higher than 1700° C.;

(B) a binding matrix which binds these grains together and predominantly consists of aluminum nitride AlN of hexagonal structure and/or of at least one of the polytypes of AlN designated in the Ramsdell notation by 2 H, 27 R, 21 R, 12 H and 15 R, as determined from an X-ray diffraction pattern; and (C) hexagonal boron nitride particles and/or crystalling graphite flakes dispersed int he binding matrix.

The following may be mentioned as non-limiting examples of refractory materials which can make up the grains (A): corundums, magnesia and $MgO-Al_2O_3$ spinel, regardless of whether these products are electrocast or sintered; electrocast materials having an alumina content of at least 85% by weight; aluminum oxycarbides of the $Al_4O_4C$ and $Al_2OC$ types and products based on aluminum oxynitride. If ingredient (C) is boron nitride, electrocast mullite, materials of the mullite-zirconia type and zirconia may also be used as ingredient (A). The choice of the nature of the grains used will depend on the particular application envisaged.

The proportion of grains (A) in the materials of the invention may widely depending on the properties desired for the material. By way of illustration, the proportion of grains (A) may range from 32 to 85% by weight approximately. Currently, a proportion of 50 to 80% by weight approximately is preferred.

The binding phase (B) which binds the grains (A) together predominantly consists of aluminum nitride AlN of hexagonal structure and/or of at least one of the polytypes designated int he Ramsdell notation by 2 H, 27 R, 21 R, 12 H and 15 R, as determined from an X-ray diffraction pattern. Since AlN is sensitive to water, for applications where the material is liable to be exposed to water it is advantageous to promote the development of the abovementioned polytypes.

The proportion of binding phase (B) may also vary widely. By way of illustration, the proportion of the binding phase (B) may range from 10 to 40% by weight approximately. Currently, a proportion of 15 to 30% by weight approximately is preferred.

The particles or flakes (C) dispersed in the binding phase may consist of boron nitride, crystalline graphite or a mixture of these. The crystalline graphite is in the form of flakes. The presence of these particles or flakes within the binding phase may be observed on photomicrographs taken with a scanning electron microscope.

The proportion of particles or flakes (C) may also vary widely. By way of illustration, the proportion of particles or flakes (C) may range from 3 to 42% by weight. Currently a proportion of 5 to 25% approximately is preferred.

It should be noted that the proportions of the constituents of the materials of the invention are given only by way of illustration and in an approximate manner inasmuch as the determination of these proportions is difficult to carry out with precision in the final material.

All of the materials of the invention have an excellent resistance to corrosion by cast iron or steel. Thus, in the test to determine the corrosion by steel using the dynamic method known as "rotary fingers" described below, all of the material of the invention showed a zero or virtually zero reduction in thickness for a test period of 4 hours, the testpieces being moved at a linear speed of 2.4 cm/second and the steel being an XC38 steel at 1700° C. kept under an argon atmosphere.

The invention also relates to a process for the production of refractory materials according to the invention.

This process comprises (1) preparing a batch comprising a mixture of the following constituents in the indicated proportions:
 a) 35 to 88% by weight of grains at least 90% of which are between 50 $\mu$m and 5 mm in size, these grains consisting of a refractory material whose melting point and, where appropriate, thermal decomposition temperature are higher than 1700°0 C.;
 b) 0 to 25% by weight of particles at least 90% of which are smaller than 50 $\mu$m in size, these particles consisting of a refractory material identical to or different from that of the grains (a), with the exception of magnesia, the melting point and, where appropriate, thermal decomposition temperature of said refractory material being higher than 1700° C., on condition that the sum of the ingredients (a) and (b) does not exceed 88% by weight;
 c) 7 to 30% by weight of aluminum powder, at least 90% of the particles of which are smaller than 80 $\mu$m in size;
 d) from 3 to 45% by weight of hexagonal boron nitride particles or crystalline graphite flakes or a mixture of these, at least 80% of the graphite flakes being larger than 100 $\mu$m in size,
 e) 0 to 3% of a dried and ground refractory clay, the sum of the ingredients (a) to (e) making up 100%; and
 f) a small amount of a temporary binder;
(2) shaping the resulting mixture into the desired shape by pressing;
(3) drying the shaped mixture; and
(4) firing—the shaped and dried mixture under a nitrogen atmosphere at a temperature of 1300° C. to 1600° C.

The shaping carried out in step (2) may be effected by uniaxial or isostatic pressing, in a conventional manner. The role of the clay (e) is that of a pressing additive facilitating shaping.

The drying step (3) may be carried out at a moderately high temperature, for example from 100° to 200° C., preferably about 150° C.

The duration of the firing step (4) may vary widely depending, in particular, on the size of the shaped and dried article. By way of illustration, a holding time of 4 to 10 hours approximately at a temperature of 1300° to 1600° C. is usually satisfactory.

It will be noted that there is a difference between the granulate, graphite and boron nitride contents in the initial mixture and the proportions of the same constituents in the finished product, since firing is accompanied by a nitrogen fixation and thus by an increase in weight, causing said contents in the finished product to be less than in the starting mixture.

The grains (a) may consist, for example, of electrocast or sintered, and ground, corundum (alumina), magnesia or MgO-Al$_2$O$_3$ spinel; and electrocast and ground material having an alumina content of at least 85% by weight; aluminum oxycarbides of the Al$_4$O$_4$C and Al$_2$OC types or a product based on aluminum oxynitride. If the ingredient (d) is boron nitride, electrocast mullite, materials of the mullite-zirconia type and zirconia may also be used as ingredient (a). Electrocast or sintered corundum particles (tabular alumina) are currently a preferred ingredient (a).

The particles (b), the use of which is optional, are chosen from the same list of materials as that given for the grains (a), except MgO. However, for a given mixture it is not necessary for the material of the particles (b) to be identical to that of the grains (a). Currently it is preferred to use an ingredient (b) formed from calcined alumina. A preferred proportion of ingredient (b) ranges from 9 to 25% by weight approximately.

High contents of constituents (c) and (d) obviously correspond to low or zero contents of constituent (b).

If it is desired to promote the formation, in the binding matrix of products of the invention, of at least one of the polytypes of AlN, it is appropriate to ensure the presence in the starting batch of a mixture of fine alumina particles smaller than 20 $\mu$m in size and silicon powder in a ratio by weight of Si/Al$_2$O$_3$ of less than about 1:3, it being possible for the proportion of silicon powder to be up to about 35% of the weight of aluminum, with the additional condition that the sum of silicon powder + aluminum powder does not exceed 30% of the weight of ingredients (a) to (e). In this case the fine alumina will be regarded as being part of constituent (b).

When ingredient (d) is graphite, the latter is in the form of flakes.

The temporary binder (f) may consist of any known temporary binder. Examples which may be mentioned are phenolic resins, furfuryl and polyvinyl alcohols, aqueous solutions of dextrin or carboxymethyl cellulose, or calcium lignosulfonate, etc. By way of illustration, an amount of temporary binder of the order of 2 to 4% by weight approximately, relative to the sum of the ingredients (a), (b), (c), (d) and (e), has usually proved satisfactory.

The invention is illustrated in a non-limiting manner, by the following examples. In these examples, 220×110×60 mm test bricks were prepared by a process in which the starting constituents were mixed, per 10 kg batch, in a Bonnet mill, shaped into bricks with the aid of a hydraulic press exerting a pressure of 1000 bars, dried at pb 150° C. and then fired under nitrogen, in an industrial electric furnace, at a temperature of 1300° to 1600° C. for 4 to 10 hours, as appropriate.

The properties of the materials obtained were determined by the following tests:

Flexural strength at elevated temperature: measured in air after accelerated heating to limit the oxidation effects.

Resistance to thermal shock: this is expressed by the reduction in %, in the cold flexural strength measured on 125×25×25 mm bars after the following treatment: sudden introduction of the testpieces at ambient temperature into a furnace heated at 1200° C., holding for 30 min followed by quenching of the testpieces in cold water.

Resistance to corrosion by steel and slags: this is determined by the dynamic method known as "rotating fingers". Four testpieces, cut in the form of bars, are fixed in a circle on a support provided with a rotary movement about a vertical axis. At lest one of the testpieces serves as reference.

The attacking agent (steel or slag) is placed in a refractory crucible and brought to the test temperature. When the test temperature is reached, the support carrying the testpieces is lowered so as to immerse the lower end of the testpieces into the molten steel or slag for a predetermined time. At the end of the test, the support carrying the testpieces is raised so as to extract the testpieces from the molten attaching agent before solidification of the latter. After cooling, the loss in thickness of the testpieces is determined and, if necessary, the corrosion front is examined under by microscopy.

Resistance to corrosion by covering powder: covering powder, which is made up of compounds having a relatively low melting point, is introduced into the ingot molds in order to protect the surface of the cast metal (steel) against oxidation,. The parts which are located at the steel/covering powder interface, such as the immersed nozzles, undergo intense and localized corrosion at said interface.

The test to determine the resistance to corrosion by covering powder is carried out by the rotary fingers method described above with reference to the resistance to corrosion by steel and slags.

Other properties: the other properties, such as the density, the porosity, the color flexural strength, etc., were determined by the methods customarily used for refractory products.

The following starting materials were used in the examples:

Spinel: an electrocast $MgO-Al_2O_3$ spinel containing 69% $Al_2O_3$ and 30% MgO, marketed by Universal Abrasives.

Sintered magnesia: a magnesia sold under the name NedMag 99 by Billiton Refractories and having the following specifications: MgO>98%, $SiO_2<1\%$, $B_2O_3<0.05\%$, with a $CaO/SiO_2$ ratio >2.

Aluminum oxycarbide: electrocast granulate containing about 2.5% of carbon, consisting of a mixture of $Al_4O_4C$ and $Al_2OC$ aluminum oxycarbides and corundum and obtained by a process described in U.S. Pat. No. A-4,241,533.

Aluminum oxynitride: fused grains containing about 3.6% of nitrogen and corresponding approximately tot he composition formula $3AlN.7Al_2O_3$, marketed by Nippon Crucible under the name ALON.

Calcined alumina: a commercially available alumina containing at least 99.5% of $Al_2O_3$ and having an average particle diameter of about 5 μm with 90% of the particles between 1 and 20 μm.

Electrocast corundum corresponding to the following analysis in % by weight: $Al_2O_3=96\%$, $TiO_2=3$, $SiO_2=0.6\%$, $Fe_2O_3=0.2\%$, $CaO+MgO+Na_2O+K_2O=0.2\%$.

Commercially available silicon powder, sold under the name "Silicium T.140" by Péchiney Electrométallurgie, at least 90% of the particles of which are less than 150 μm in size.

Commerically available aluminum powder, sold under the name "Aluminium 200 TV" by Péchiney Electrométallurgie, at least 90% of the particles of which are less than 80 μm in size.

Crystalline natural graphite in the form of flakes originating from China or Madagascar, having an ash content of less than 17% by weight and at least 80% of the particles of which are greater than 100 μm in size.

Hexagonal boron nitride, sold under the name HCST-A05 by the company Herman C. Starck. This nitride is formed of agglomerates from 1 to 10 μm in size consisting of individual platelets about 0.5 to 1 μm in size.

Ground clay, sold under the name "DA.40/42" by Denain Anzin Mineraux, having the following chemical analysis in % by weight: $Al_2O_3=36\%$, $Si_2O=47\%$, $Fe_2O_3=1.8\%$, $TiO_2=1.8\%$, $CaO+MgO+Na_2O+K_2O=0.8\%$, loss on ignition: 12.6%.

EXAMPLE 1

A series of samples B to E formed of corundum grains with AlN binder containing various proportions of boron nitride dispersed within the binder was prepared by the general method described above. A sample A free from boron nitride was also prepared by way of comparison.

Table I below lists the constituents of the starting batch and their proportions, various properties of the materials obtained and the contents of AlN binding matrix and of boron nitride BN dispersed in this matrix, as determined from a X-ray diffraction pattern. The content of refractory grains is the difference between 100% and the sum of AlN+BN.

TABLE I

|  |  | Samples | | | | |
| --- | --- | --- | --- | --- | --- | --- |
|  |  | A (Comparative) | B | C | D | E |
| Starting Ingredient | Black corundum (2/0.2 mm) | 40 | 40 | 40 | 40 | 40 |
|  | Black corundum (0.2/0.05 mm) | 20 | 20 | 20 | 20 | 20 |
|  | Calcined alumina | 25 | 21 | 17 | 13 | 9 |
|  | Aluminum powder | 12 | 12 | 12 | 12 | 12 |
|  | Boron nitride | 0 | 4 | 8 | 12 | 16 |
|  | Ground clay | 3 | 3 | 3 | 3 | 3 |
|  | Dextrin powder | +0.5* | +0.5 | +0.5 | +0.5 | +0.5 |
|  | Water | +2 | +2 | +2 | +2 | +2 |
| Properties | Density after conversion to nitride | 3.13 | 3.12 | 2.97 | 2.90 | 2.88 |
|  | Flexural strength at 20° C. (bars) | 600 | 413 | 280 | 200 | 162 |
|  | Flexural strength at 1500° C. (bars) | 230 | 220 | 230 | 160 | 110 |
|  | Resistance to thermal shock** % | −100 | −82 | −61 | −59 | −55 |
| Mineralogical composition of | -AlN, % | 17 | 17 | 17 | 17 | 17 |
|  | -BN, % | 0 | 3.7 | 7.5 | 11.2 | 15 |

TABLE I-continued

| | Samples | | | | |
|---|---|---|---|---|---|
| | A (Comparative) | B | C | D | E |
| the material | | | | | |

*The "+" symbol indicates that the indicated amount is given relative to 100% of the other constituents
**After 1 20° C./1200° C./water cycle It is seen from Table I that the additions of BN rapidly improve the resistance to thermal shock. Despite the regular decrease int he color mechanical strength, the mechanical strength at 1500° C. is held at a high level up to at least 8% BN.

Slide closing plates were produced from composition C and their behavior in service as compared with that of a corundum material containing a mullite binder, which is currently typical for this application. Insignificant wear of the plates according to the invention was observed, whereas the reference material reached the limit of acceptable wear.

Table IA shows that the main advantage of the novel material lies in its high mechanical strength at elevated temperature.

The tribological properties associated with the presence of BN have also played a favorable role in this application where two refractory parts must slide one against the other.

TABLE IA

| | Typical product | Product according to the invention |
|---|---|---|
| Product type | Corundum with zirconia-doped mullite binder | Sample C |
| Al₂O₃ % | 87.5 | 75 |
| SiO₂ | 7.5 | 0.5 |
| ZrO₂ | 4.5 | — |
| AlN | — | 17 |
| BN | — | 7.5 |
| Density | 3.15 | 2.97 |
| Flexural strength at 1500° C. (bar) | 110 | 230 |
| Resistance to thermal shock | −59 | −61 |
| Resistance to corrosion by steel, degree of wear (%) | 0 | 0 |

EXAMPLE 2

A series of sample F to L formed of corundum grains with an AlN binder containing various proportions of crystalline graphite dispersed within the binding matrix was prepared using the general method described above.

Table II below lists the constituents of the starting batch and their proportions, various properties of the materials obtained and the contents of AlN biding matrix and graphite dispersed int his matrix, as determined from a X-ray diffraction pattern. The content of refractory grains is the difference between 100% and the sum of AlN + graphite.

TABLE II

| | | Samples | | | | | | | |
|---|---|---|---|---|---|---|---|---|---|
| | | A (Comparative) | F | G | H | I | J | K | L |
| Starting Ingredients | Black corundum (2/0.2 mm) | 40 | 40 | 40 | 40 | 40 | 40 | 40 | 40 |
| | Black corundum (0.2/0.05 mm) | 20 | 20 | 20 | 20 | 20 | 20 | 20 | 0 |
| | Calcined alumina | 25 | 21 | 21 | 17 | 13 | 9 | 0 | 0 |
| | Aluminum powder | 12 | 12 | 11 | 12 | 12 | 12 | 12 | 12 |
| | Graphite flakes | 0 | 4 | 5 | 8 | 12 | 16 | 25 | 45 |
| | Ground clay | 3 | 3 | 3 | 3 | 3 | 3 | 3 | 3 |
| | Dextrin powder | +0.5* | +0.5 | +0.5 | +0.5 | +0.5 | +0.5 | +0.5 | +0.5 |
| | Water | +2 | +2 | +2 | +2 | +2 | +2 | +2 | +2 |
| Properties | Density after conversion to nitride | 3.13 | 3.11 | 3.08 | 2.98 | 2.90 | 2.80 | 2.73 | 2.36 |
| | Flexural strength at 20° C. (bars) | 600 | 595 | 540 | 333 | 261 | 173 | 94 | 50 |
| | Flexural strength at 1500° C. (bars) | 230 | 190 | 200 | 180 | — | 120 | 60 | — |
| | Resistance to thermal shock** % | −100 | −91 | −76 | −75 | −69 | −57 | −32 | 0 |
| Mineralogical composition of the material | -AlN, % | 17 | 17 | 15.7 | 17 | 17 | 17 | 17 | 17 |
| | -graphite, % | 0 | 3.2 | 4 | 6.4 | 9.6 | 12.8 | 20 | 36 |

*The "+" symbol indicates that the indicated amount is given relative to 100% of the other constituents
**After 1 20° C./1200° C./water cycle It is seen from Table II that the resistance to thermal shock improves as the addition of graphite increase.

The physical characteristics and the resistance to thermal shock of sample l are close to those of an alumina/graphite product with a resin binder, containing 38% of graphite, which is currently commonly used to produce jet protection tubes and immersed nozzles.

EXAMPLE 3

A sample M formed from corundum grains with AlN binder containing both boron nitride and graphite dispersed within the binding matrix was prepared by the general method described above. This sample was compared with samples A (without additive), G (containing 5% of graphite) and C (containing 8% of BN).

Table III below lists the constituents of the starting batch and their proportions, various properties of the materials obtained and their AlN, BN and graphite contents, as determined from a X-ray diffraction pattern.

EXAMPLE 4

A series of samples P to S formed from grains of diverse nature with AlN binder containing boron nitride dispersed within the binding matrix was prepared using the general method described above.

Table IV below lists the constituents of the starting

TABLE III

|  |  | Sample |  |  |  |
|---|---|---|---|---|---|
|  |  | C | G | M | A (Comparative) |
| Starting Ingredients | Black corundum (2/0.2 mm) | 40 | 40 | 31.5 | 40 |
|  | Black corundum (0.2/0.05 mm) | 20 | 20 | 20 | 20 |
|  | Calcined alumina | 17 | 21 | 21 | 25 |
|  | Aluminum powder | 12 | 11 | 11 | 12 |
|  | Boron nitride | 8 | — | 8.5 | — |
|  | Graphite flakes | — | 5 | 5 | — |
|  | Ground clay | 3 | 3 | 3 | 3 |
|  | Dextrin powder | +0.5* | +0.5 | +0.5 | +0.5 |
|  | Water | +2 | +2 | +1.8 | +1.8 |
| Properties | Density after conversion to nitride | 2.97 | 3.08 | 2.83 | 3.13 |
|  | Flexural strength at 20° C. (bars) | 280 | 540 | 290 | 600 |
|  | Flexural strength at 1500° C. (bars) | 230 | 200 | 182 | 230 |
|  | Resistance to thermal shock** | −61 | −76 | −56 | −100 |
|  | Corrosion 1500° C./3 h/air degree of wear (%)*** | −28 | −33 | −30 | −81 |
| Mineralogical composition of the material | -AlN, % | 17 | 15.7 | 15.7 | 17 |
|  | -BN, % | 7.5 | 0 | 8 | 0 |
|  | -graphite, % | 0 | 4 | 4 | 0 |

*The "+" symbol indicates that the indicated amount is given relative to 100% of the other constituents
**After 1 20° C./1200° C./water cycle
***Steel/covering powder interface It is seen from Table III that the joint incorporation of BN and graphite (sample M) permits an improvement in the resistance to thermal shock which is better than that observed for the materials which contain only BN or graphite. The resistance to corrosion by covering powder of the three samples according to the invention (C, G and M) is also clearly superior to that of the comparative sample A to which neither BN nor graphite was added.

batch and their proportions and various properties of the materials obtained. Table IV also reproduces the data from sample C of Table III. The AlN and BN contents of samples P to S were virtually the same as those of sample C. It will be noted that in compositions P and S the constituent (b) differs from constituent (a), calcined alumina having been chosen in these examples as constituent (b), essentially for economic reasons.

TABLE IV

|  |  | Sample |  |  |  |  |
|---|---|---|---|---|---|---|
|  |  | C | P | Q | R | S |
| Starting Ingredients | grains type (2 mm to 0.05 mm) % | Black corundum 60 | MgO/Al$_2$O$_3$ spinel 56.5 | Sintered MgO 54.5 | A1404C 54.5 | AlON 56.5 |
|  | Fine magnesia (0 to 0.05 mm) % | — | — | 22 | — | — |
|  | Fine alumina oxycarbide (0 to 0.05 mm) % | — | — | — | 22 | — |
|  | Calcined alumina | 17 | 21 | — | — | 21 |
|  | Aluminum powder | 12 | 11 | 12 | 12 | 11 |
|  | BN | 8 | 8.5 | 8.5 | 8.5 | 8.5 |
|  | Ground clay | 3 | 3 | 3 | 3 | 3 |
|  | Dextrin powder | +0.5* | +0.5 | +0.5 | +0.5 | +0.5 |
|  | Water | +2 | +1.9 | +1.7 | +1.7 | +1.7 |
| Properties | Density after conversion to nitride | 2.97 | 2.67 | 2.68 | 2.74 | 2.82 |
|  | Flexural strength at 20° C. (bars) | 280 | 205 | 170 | 225 | 365 |
|  | Flexural strength at 1500° C. (bars) | 230 | 98 | 50 | 81 | 175 |
|  | Resistance to thermal shock** | −61 | −70 | −63 | −69 | −82 |
|  | Corrosion 1500° C./5 h/air covering powder Degree of wear (%)*** | −67 | −48 | −34 | −68 | — |
|  | Corrosion 1500° C./2 h/air | −29 | −26 | −12 | −25 | −30 |

TABLE IV-continued

| | | Sample | | | |
|---|---|---|---|---|---|
| | C | P | Q | R | S |
| Alkaline slag**** Degree of wear (%) | | | | | |

*The "+" symbol indicates that the indicated amount is given relative to 100% of the other constituents
**After 1 20° C./1200° C./water cycle
***Steel/covering powder interface
****Steel/slag interface - analysis of the slag: CaO: 37%-Al$_2$O$_3$: 28%-CaF$_2$: 16%-SiO$_2$: 12%-FeO: 7%

It is seen from table IV that the type of grains used influences the properties of the final material. Magnesia grains are preferable for applications where corrosion by alkaline slag or covering powder is the preponderant constraint. On the other hand, the flexural strength at elevated temperature of the material containing magnesia grains is lower than those obtained with other types of grains.

In fact, int he laboratory material Q has a resistance to corrosion which is twice as high as that of a magnesia/graphite material containing resin binder, which is customarily used int he presence of highly alkaline slags.

EXAMPLE 5

In this example the influence of an addition of silicon to the starting batch was studied. To this end, samples T, U and V were prepared from starting batches containing, respectively, 4, 8 and 14% of silicon.

Table V below indicates the starting ingredients and their proportions and various properties of the materials obtained. Table V also reproduces the data from sample C from table III, which has been prepared without the addition of silicon.

Table V also shows that when the silicon content reaches 8% a substantial proportion of $\beta'$-sialon forms in the binding phase. The resulting materials containing sialon binder are outside the scope of the invention.

The materials of the invention are useful for all types of applications int he field of steel metallurgy. They are particularly useful in closing systems of the plug and nozzle type, and as slide closure plates.

It is self-evident that the embodiments described are merely examples and that they could be modified, in particular by substitution of equivalent techniques, without in so doing going beyond the scope of the invention.

We claim:

1. A refractory material which comprises, in % by weight
   (A) 32-85% of grains of at least one refractory material whose melting point and thermal decomposition temperature are higher than 1700° C.;
   (B) 10-40% of a binding matrix produced in situ which bids these grains together, said matrix comprising a major proportion of at least one member of the group consisting of at least one of the polytypes of AlN designated in the Ramsdell notation

TABLE V

| | | Composition No. | | | |
|---|---|---|---|---|---|
| | | C | T | U*** | V*** |
| Starting Ingredients | Black corundum (2/0.2 mm) | 40 | 32.5 | 29.5 | 31.5 |
| | Black corundum (0.2/0.05 mm) | 20 | 21 | 20 | 25 |
| | Calcined alumina | 17 | 20.8 | 20.8 | 11.7 |
| | Aluminum powder | 12 | 11.2 | 11.2 | 6.3 |
| | Silicon powder | 0 | 4 | 8 | 14 |
| | Boron nitride | 8 | 8.5 | 8.5 | 8.5 |
| | Ground clay | 3 | 3 | 3 | 3 |
| | Dextrin powder | +0.5* | +0.5 | +0.5 | +0.5 |
| | Water | +2 | +2 | +2 | +2 |
| Properties | Density after converison to nitride | 2.97 | 2.88 | 2.79 | 2.77 |
| | Flexural strength at 20° C. (bars) | 280 | 397 | 260 | 150 |
| | Flexural strength at 1500° C. (bars) | 230 | 242 | 256 | 250 |
| | Resistance to thermal shock** | −61 | −73 | −59 | −64.5 |
| Mineralogical composition of the material | -AlN, % | 17 | 0 | 0 | 0 |
| | -AlN (polytype, mainly 15R) | 0 | high | moderate | low |
| | -Sialon $\beta'$, % | 0 | 0 | 20 | 36 |
| | -BN, % | 7.5 | 8 | 8 | 8 |

*The "+" symbol indicates that the indicated amount is given relative to 100% of the other constituents
**After 1 20° C./1200° C./water cycle
***Outside the scope of the invention Table V shows that the incorporation of finely divided calcined alumina and silicon in appropriate amounts in the starting batch promotes the formation of AlN polytypes, which may be desirable when the material has to be exposed to water, for example during machining operations or during storage in a moist atmosphere.

The AlN polytypes are, in fact, much less sensitive to the action of water than AlN itself.

by 2 H, 27 R, 21 R, 12 H and 15 R, and the mixtures thereof with AlN of hexagonal structure, as determined from an X-ray diffraction pattern; and
(C) 3-42% of a dispersed phase selected from the group consisting of hexagonal boron nitride particles, crystalline graphite flakes, and mixture thereof, said phase being dispersed in the binding matrix;

said refractory material exhibiting resistance to corrosion by molten steel at 1700° C.

2. The refractory material as claimed in claim 1, which comprises, in % by weight, 50-80% of (A), 15-30% of (B) and 5-25% of (C).

3. The refractory material as claimed in claim 1, wherein the grains (A) are selected from the group consisting of electrocast or sintered, and ground, corundum (alumina), magnesia, MgO-Al$_2$O$_3$ spinel, electrocast and ground materials having an alumina content of at least 85% by weight, aluminum oxycarbides of formula Al$_4$O$_4$C and Al$_2$OC, aluminum oxynitride-based materials, and mixtures thereof.

4. The refractory material as claimed in claim 1, wherein the ingredient (C) is boron nitride ad wherein the grains (A) are selected from the group consisting of electrocast mullite, materials of mullite-zirconia, and zirconia.

5. The refractory material as claimed in claim 3, wherein the grains (A) are formed from corundum.

6. A process for the production of a refractory material, which comprises:
(1) preparing a batch comprising a mixture of the following constituents in the indicated proportions:
   a) 35 to 80% by weight of grains, at least 90% of which are between 50 μm and 5 mm in size, these grains consisting of a refractory material whose melting point or thermal decomposition temperature are higher than 1700°0 C.;
   b) 9 to 25% by weight of particles at least 90% of which are smaller than 50 μm in size, these particles consisting of a refractory material identical to or different from that of the grains (a), with the exception of magnesia, the melting point or thermal decomposition temperature of said refractory material being higher than 1700° C., on condition that the sum of the ingredients (a) and (b) does not exceed 88% by weight;
   c) 7 to 30% by weight of aluminum powder, at least 90% of the particles of which are smaller than 80 μm in size;
   d) from 3 to 45% by weight of hexagonal boron nitride particles or crystalline graphite flakes or a mixture of these, at least 80% of the graphite flakes being larger than 100 μm in size;
   e) 0 to 3% of a dried and ground refractory clay, with the proviso that the starting batch contains a mixture of fine alumina particles smaller than 20 μm in size and silicon powder in a ratio by weight of Si/Al$_2$O$_3$ of less than about 1:3, it being possible for the proportion of silicon powder to be up to about 35% of the weight of aluminum, and the sum of the proportion of silicon powder and aluminum powder not exceeding 30% of the weight of ingredients (a) to (e), the alumina powder being regarded as being part of constituent (b).

the sum of the ingredients (a) to (e) making up 100%; and
   f) a temporary binder;
(2) shaping the resulting mixture into a shape by pressing;
(3) drying the shaped mixture; and
(4) firing the shaped and dried mixture under a nitrogen atmosphere at a temperature of 1300° C. to 1600° C.

7. The process as claimed in claim 6, wherein the ingredient (a) is selected from the group consisting of electrocast or sintered and ground, corundum (alumina), magnesia or MgO-Al$_2$O$_3$ spinel; electrocast and ground materials having an alumina content of at least 85% by weight; aluminum oxycarbides of formula Al$_4$O$_4$O and Al$_2$OC, aluminum oxynitride-based materials, and mixtures thereof.

8. The process as claimed in claim 6, wherein the ingredient (b) is selected from the group consisting of electrocast or sintered, and ground, corundum (alumina), MgO-Al$_2$O$_3$ spinel; electrocast and ground materials having an alumina content of at least 85% by weight, aluminum oxycarbides of formula Al$_4$O$_4$C and Al$_2$OC, aluminum oxynitride-based materials, and mixtures thereof.

9. The process as claimed in claim 6, wherein ingredient (d) is boron nitride and ingredient (b) is selected from the group consisting of electrocast mullite, materials of mullite-zirconia and zirconia.

* * * * *